United States Patent
Tokitomo et al.

[15] 3,675,541
[45] July 11, 1972

[54] PROCESS OF MAKING A TOBACCO SMOKE FILTER FROM A SPLIT FILM OF CELLULOSE ACETATE

[72] Inventors: Soichi Tokitomo, Tokyo; Masakazu Honda; Fumio Nakayama, both of Toyama; Keisiro Ueno, Otake, all of Japan

[73] Assignees: Mitsubishi Rayon Company Limited; Mitsubishi Acetate Company Limited, Tokyo, Japan

[22] Filed: June 2, 1970

[21] Appl. No.: 42,625

Related U.S. Application Data

[63] Continuation-in-part of Ser. No. 687,351, Dec. 1, 1967, abandoned.

[30] Foreign Application Priority Data

Dec. 13, 1966  Japan....................................41/81636

[52] U.S. Cl..............................93/1 C, 131/261 A, 156/83, 156/167, 156/180, 264/147, 264/288, 264/DIG. 47, 264/DIG. 48
[51] Int. Cl....................B29d 7/24, B32b 31/08, D04h 3/16
[58] Field of Search..............................131/266–269, 10 R, 131/261 R; 28/1 CF, 1 CS; 93/1 C; 156/83, 180, 167, 229, 172; 161/109, DIG. 6; 264/147, DIG. 47, DIG. 48, 288

[56] References Cited

UNITED STATES PATENTS

| | | | |
|---|---|---|---|
| 3,165,563 | 1/1965 | Rasmussen | 264/22 |
| 3,336,174 | 8/1967 | Dyer et al. | 156/167 |
| 3,344,796 | 10/1967 | Yamaji et al. | 131/267 |
| 3,353,542 | 11/1967 | Kilburn | 131/17 |
| 3,398,441 | 8/1968 | Adachi et al. | 28/72 |
| 3,468,461 | 9/1969 | Rasmussen | 225/3 |
| 2,306,666 | 12/1942 | Simmon | 176/124 |

FOREIGN PATENTS OR APPLICATIONS 1,149,115  4/1969  Great Britain ..................131/261 R

*Primary Examiner*—Robert F. Burnett
*Assistant Examiner*—Robert A. Dawson
*Attorney*—Robert E. Burns and Emmanuel J. Lobato

[57] ABSTRACT

A cellulose acetate film is subjected to stretch operations which are carried out under conditions such that highly oriented molecular chains are created therein and then to splitting whereby a netlike configuration composed of numerous stem fibers and branch fibers linking adjacent stem fibers is obtained. A tobacco smoke filter is formed from the split acetate film after additional treatments including crimping.

7 Claims, 7 Drawing Figures

PROCESS OF MAKING A TOBACCO SMOKE FILTER FROM A SPLIT FILM OF CELLULOSE ACETATE

The present application is a continuation-in-part of our copending application, Ser. No. 687,351, filed on Dec. 1, 1967, now abandoned.

BACKGROUND OF THE INVENTION

This invention relates to a tobacco smoke filter composed of cellulose acetate in the form of split film. More particularly, the present invention relates to a tobacco smoke filter composed of split cellulose acetate film having a netlike configuration of numerous stem fibers and branch fibers which link adjacent stem fibers and a process for producing the same.

Generally, conventional cigarette filters are composed of a mass of fibers, such as rayon or acetate fiber, polyolefin fiber, etc. In the present cigarette filters, acetate fiber is preferably used due to its excellent features.

A typical method for manufacturing conventional cigarette filters comprises opening a tow of crimped fibrous material for the filter; adding some suitable bonding agent or plasticizer to the opened material; gathering the prepared material to form a cylindrical mass and making the cylindrical mass of material compact; next, wrapping a paper around the cylindrical mass of material and then cutting the wrapped cylindrical mass of material into rods for use as filters for cigarettes.

Another method for manufacturing a cigarette filter wherein the addition of the bonding agent to the opened material is omitted has also been proposed.

However, in the first case, the selection of a suitable bonding agent or plasticizer is necessary to obtain cigarette filters of uniform quality; further, the process for manufacturing the filter is complex and the expense of installation and maintenance of manufacturing machines is high. In the second case, a filter plug having an uneven cut face is sometimes produced because the fibers contained in the gathered cylindrical mass are not bonded to each other; further, it is inevitable that the cut waste of the fiber is mixed into the recovered tobacco which is one of the raw materials of a lower grade cigarette.

SUMMARY OF THE INVENTION

The principal object of the present invention is to provide a tobacco smoke filter with which excellent filtration of the tobacco smoke can be obtained.

Another object of the present invention is the provision of a filter which provides excellent filtration of tobacco smoke and which is composed of a netlike configuration of fibers made from a split film of cellulose acetate which has the property of being readily splittable and fibrillated.

Another object of the present invention is to provide a method for manufacturing a tobacco smoke filter whereby the defects of conventional manufacturing methods are eliminated.

It has been discovered that a highly effective filter for tobacco smoke is comprised of a bundled mass of split cellulose acetate film having a plurality of stem fibers and branch fibers connected to each other in a netlike configuration and provided with crimp, said stem fibers having an average diameter of not more than 39.5 microns, the unit length of said stem fibers as defined by adjacent branch fibers being below 20mm. and the total fineness of said cylindrical mass being below 100,000 denier.

According to the invention, the cellulose acetate film used for a tobacco smoke filter is obtained by stretching a film of cellulose acetate in a two-stage operation to cause a high orientation of the molecular chain along the length of the film and then to split the stretched film into a netlike configuration containing stem fibers and branch fibers as described above. In the two-stage stretching operation, the film is first stretched at a stretch ratio of about 1.1 to 1.6 and then in an aqueous solution containing 1 to 3 percent of phenol where spontaneous stretching takes place, the total stretch ratio in the second stage of the stretching operation is in the range of about 1.4 to 4.0 with respect to an acetate fiber of non-stretched condition.

The tobacco smoke filter of the present invention may be used in any tobacco product, such as cigarettes, cigars or in cigarette or cigar holders or in a tobacco pipe stem; further, the filters of the present invention may be formed to fit into a refillable filter holder for use in any smoking article.

DESCRIPTION OF THE INVENTION

Figure 1:
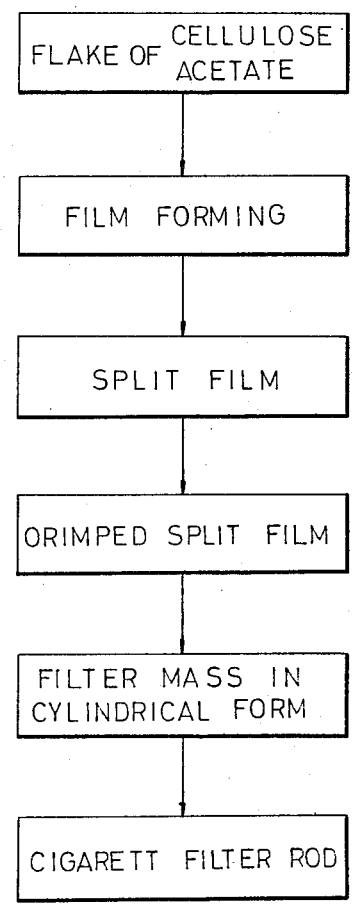
FIG. 1 is a flow sheet of an embodiment of the method for manufacturing a tobacco smoke filter according to the invention.

Referring to FIG. 1, the tobacco smoke filter of the invention is manufactured by a process which involves splitting a film of cellulose acetate by a conventional mechanical method whereby the cellulose acetate film is converted into a split film having a netlike configuration formed as a result of the splitting up motion of the splitting machine. Next, the split film having a netlike configuration is provided with crimps by a crimping machine; the crimped film is gathered, to form a cylindrically shaped filter mass, and then wrapped with a paper. Thereafter, the wrapped cylindrical mass is cut transversely into filter rods. When it is required to bond the fibers of the film at their contact point, a bonding treatment is applied to the fiber film before it is gathered.

However, it has been found that the usual acetate film cannot be used for the present purpose because of its poor splitability and fibrillatability. By splitability is meant the spontaneous enlargement of a slit or cut out portion, in the working direction of the mechanical slitting or cutting means, which occurs in some films when a portion of a film is cut or slit by certain mechanical action, such as a knife under tension. Generally films which are splitable also have the property of undergoing fibrillation, i.e. the ability to form fibrils along the splitting direction.

To clarify the cause of the poor splitability and fibrillatability of the usual acetate film, many experimental tests were carried out and it was discovered that it is difficult to effect splitting of acetate film in a lengthwise direction and to cause fibrillation of the film, and it has been concluded that this difficulty is due mainly to the difficulty of creating a high orientation of the molecular chain along the length of the film even when a stretching operation is applied. Generally to split film and create fibrils, when a film is partly cut along the length thereof, it is necessary that the cut line expand readily along its length rather than laterally in order that splitting of the film take place along its length. However, it has been found that in the case of acetate film, the dimensions of the cut out portions of the film created initially by the mechanical slitting or cutting action do not change much over a long period of time without the application of additional mechanical splitting action nor are fibrils generally created. Further, the cut line of ordinary acetate film expands along the length and also laterally. While the present invention is not limited by theoretical considerations, the main reason for poor splitability of the acetate film is believed to be due to poor orientation of the molecular chain.

In order to attain the purpose of the present invention it is desirable to produce an acetate film having high orientation of the molecular chain, i.e. a cellulose acetate which may be readily split to form a netlike configuration and which contains numerous fibrils.

According to the present invention, it has been found preferable to use a diacetate film having degree of acetylation of 48–60percent and more, preferably 52–58percent.

An acetate film having the desired splitability is prepared by a two-stage process. In the first stage, the film is stretched along its length at a stretch ratio between 1.1 and 1.6. In the second stage of the stretching process, the acetate film is spontaneously stretched along its length in an aqueous solution containing 1–3percent phenol at a temperature maintained in a range from 20° to 100°C., preferably in a range from 50° to 70° C., while positively stretching the film so that the total stretching ratio (positive stretch ratio and spontaneous stretch ratio) is between 1.4 and 4.0. The film is then washed in an alkaline bath to remove the phenol residue and dried.

The first stretching operation may be carried out under dry conditions at a temperature higher than 200°C. However, it has been found to be advantageous to carry out this operation in a liquid containing a swelling agent. Any swelling agents which do not dissolve the diacetate film can be used. Particularly, an aqueous solution containing 70–80percent methanol or ethanol, a liquid containing 80percent benzene and 20percent alcohol, or a liquid containing nitrobenzene 90percent and alcohol 10percent is preferably used. The temperature of the solution in which the first stretching operation is carried out is preferably maintained between room temperature and about 30°C.

Figure 3:
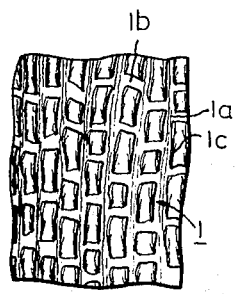
FIG. 3 is another explanatory drawing of the configuration of the split acetate film according to the present invention.

It has been found that the acetate film prepared as just described has excellent properties of splitability and of creating fibrils and thereby is readily converted to a film having a netlike configuration as shown in FIG. 3. An acetate film treated by a two-stage stretching operation according to the present invention is readily fibrillated. The cut out portions are provided with a certain number of fibrils and the shapes and dimensions of these portions tend to change even when a weak mechanical splitting action is applied.

A film having a thickness between 0.01 and 0.04 mm. is preferably used to attain the purposes of the present invention.

The present tobacco smoke filter comprising a plurality of split fibers of cellulose acetate having a netlike configuration has excellent properties with regard to the taste, smell and filtration of the tobacco smoke. Some additional substances for example, a delustering agent such as titanium dioxide or zinc oxide, plasticizer such as triacetylene, coloring agent, absorbent such as active carbon, additional substances to improve the taste or smell of the tobacco such as sorbitan monolaurate, propylene glycol stearate, may be added to the film before the splitting up operation; additives which do not disturb the splitting up of the film and also which are not injurious to health and are not dangerous substances may be added to the film.

A cellulose acetate film for the present invention may be produced by extruding a solution of acetate flakes containing the above-mentioned additives through a slit orifice. However, as already mentioned, such film is not readily split and therefore it is preferable to stretch the film produced by this method in order to allow fibrillation of the film to take place easily.

Many methods for splitting film are well known, as disclosed in U.S. Pat. Nos. 3,253,072, 3,302,501, etc.; however, a splitting machine provided with a plurality of revolving blades is preferable for splitting the present film. It is also preferable to provide a fine splitting up motion in order to obtain fine split cellulose acetate fibers so that effective filtration of tobacco smoke is obtained. That is, better filtration of tobacco smoke is obtained with increasing fineness of the split-up fibers.

Figure 2:
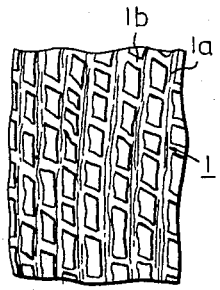
FIG. 2 is an explanatory drawing of the configuration of fibers of the split film of cellulose acetate of the invention.

It has been found that a cellulose acetate film which has been subjected to the two-stage stretching operation discussed above may be split into a desired netlike configuration containing many fibrils by mechanical means, for example, by a roller covered by numerous needle wires or pins, even though such means does not readily yield the same desirable results when applied to conventional acetate film. With reference to FIG. 2 which illustrates the configuration of the split fibers, the netlike configuration 1 includes a plurality of stem fibers 1a and linking the stem fibers, a plurality of branch fibers 1b. FIG. 3 which also illustrates the netlike configuration of the split cellulose acetate film of the invention shows, in addition to the stem fibers 1a and branch fibers 1b, many fibrils 1c which are present in the split film. According to the invention, the average denier of the stem fibers 1a must be not more than 15 denier, preferably 6 denier, and the unit length of the stem fibers 1a, defined by two adjacent branch fibers 1b, is preferably below 20.0 mm. to prevent separation of individual stem fibers from the cylindrical mass of the split film.

In the process of the present invention, a conventional crimping method utilizing the stuffing box system or gearing system may be applied. Further, when it is desired to make a more compact filter rod, a bonding agent such as a solution of resin, cellulose derivative, glue, casein, or other plastic or adhesive material may be added to the split film after the above mentioned crimping operation. In this case, it is preferable to spread out the split film by means of a spreading machine; thereby the film sheet of netlike configuration, comprising a plurality of stem fibers linked by branch fibers, is clearly developed, a bonding agent in a liquid condition is then sprayed on the film sheet and the film is dried.

Figure 5:
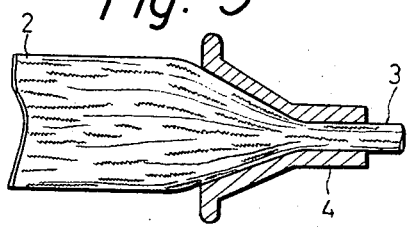
FIG. 5 is a perspective view illustrating one method of forming the filter shown in FIG. 4.
Figure 6:
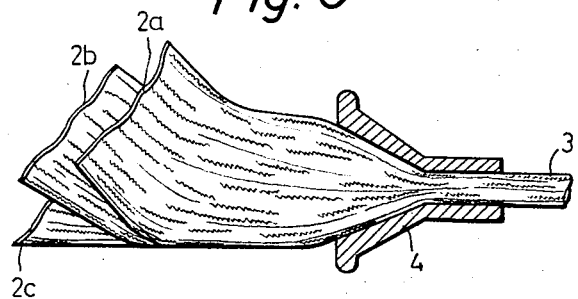
FIG. 6 is a perspective view illustrating another method of forming the filter shown in FIG. 4.
Figure 7:
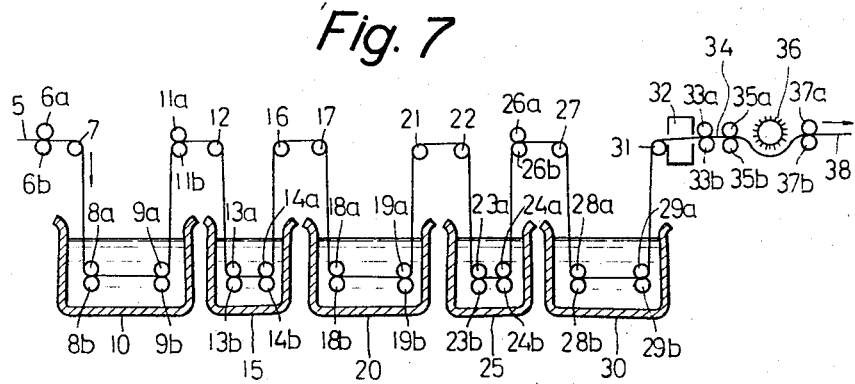
FIG. 7 is a schematic diagram for stretching and splitting an acetate film according to the present invention

The filter of the invention may be produced in a number of ways, for example, with reference to FIG. 5 and 6, after forming a sheet 2 of the split fibers having the netlike configuration shown in FIG. 2 or 3, the sheet 2 of the split fibers is gathered by a trumpet 4, thereby the cylindrical mass of split fibers provided with the corresponding thickness of the cigarette filter can be obtained.

Figure 4:
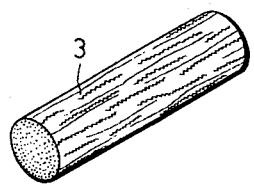
FIG. 4 is a side view of a cylindrical mass of the netlike configuration of fibers according to the present invention.

Thereafter, the cylindrical mass 3, illustrated also in FIG. 4, may be cut transversely into individual filter rods as desired. In FIG. 6, a plurality of crimped sheets of split fibers, for example, three sheets 2a, 2b and 2c having the netlike configuration illustrated in FIGS. 2 and 3, are superimposed on each other and next, the combined films 2a, 2b and 2c are gathered together to form a cylindrical mass 3. The number of films to make the cylindrical mass must be decided by the mass of the sheet of split fibers.

It has been found that the thinner the diacetate film used, the finer are the numerous stem fibers and branch fibers linking adjacent stem fibers produced when the film is split.

On the other hand, the average fineness of the abovementioned stem fibers can be made coarser by applying rough splitting action. Since a pertinent hardness and character of filtration is required for a tobacco smoke filter, the total thickness of the filter must be chosen in accordance with the average fineness of the stem fibers. The following table shows the pertinent conditions relative to the average fineness of the stem fibers and the total thickness of the tobacco smoke filter which have resulted from our discoveries.

| Average fineness of stem fibers in deniers(F) | Calculated diameter in $\mu$(D) | Total thickness of the smoke filter in deniers |
| --- | --- | --- |
| 5 | 23.0 | 40,000–100,000 |
| 7 | 27.3 | 70,000–100,000 |
| 15 | 39.8 | 100,000 |

Since it is very difficult to measure the actual dimension of the fineness of stem fibers, a conventional method for evaluating the fineness of textile fibers, that is the denier system, is applied. Further, to determine the dimension of the fineness of the stem fibers, the "calculated diameter of the stem fiber" is obtained by the following formula, $$r = \sqrt{\frac{F}{9 \times \pi \times 10^5 \times \rho}}$$

$$D = 2r$$

where,

D represents the calculated diameter of a stem fiber,

ρ represents the specific gravity of the film (ρ of diacetate film is 1.32). In this calculation, the lateral cross section of the stem fiber is considered as a true circle.

For example, when using a diacetate film having a thickness of 20 microns, a tobacco smoke filter tip, having total thickness of 55,000 denier and average fineness of the stem fibers of 4.0 denier was produced. The characteristic feature of this filter was pertinent for the purpose; that is, when the tip length was 17 mm., the weight of the tip was 158 mg., aspiration resistance 57 mm., the absorption quantities of tar, nicotine, phenolic agent were 34percent, 28percent, 63percent, respectively when measured by an ultraviolet absorption spectrometer, the hardness of the filter tip was 12percent when measured with a precision micrometer of the dead weight type manufactured by the Testing Machine Co., type TMT.

As mentioned above, there are several embodiments of the process for manufacturing the tobacco smoke filter according to the present invention which are simpler than the process of the conventional manufacturing method of the cigarette filter. Thus, in the process of the present invention, the spinning process for manufacturing tow, comprising numerous filaments, which requires expensive equipment and the maintenance cost of which is high, can be avoided. Further, it is possible to produce the tobacco smoke filter of the invention by a continuous process in a highly economical manner, as shown by the flow sheet of FIG. 1.

Further, according to the process of the present invention, it is possible to provide the tobacco smoke filter with sufficient compactness and hardness for practical use without treatment with a bonding agent. Consequently, the manufacturing cost of the tobacco smoke filter may be substantially reduced by the process of the invention.

The following examples further illustrate the best mode currently contemplated for carrying out the present invention, but these examples are not to be construed as limiting the scope of the invention in any manner.

EXAMPLE 1

Referring to FIG. 6, a non-stretched diacetate film 5 was fed to a stretch device by a pair of feed rollers 6a, 6b and a guide roller 7. The stretch device comprises two pairs of rollers 8a, 8b and 9a, 9b. The film 5 was stretched in an aqueous methanol solution 10 by this device at a stretch ratio of 1.4. Next, the stretched film was squeezed by a pair of squeezing rollers 10a, 10b so that the methanol solution was squeezed from the film, then the film was washed in a water bath 15 so as to remove the methanol completely from the film. The film was further fed to a next bath 20 containing an aqueous solution of phenol and provided with a second stretch means comprising two pairs of rollers 18a, 18b and 19a, 19b, after passing over guide rollers 16 and 17. While being carried through this bath, the film spontaneously stretched while the stretch means stretched the film in the phenol aqueous solution at a stretch ratio of 2.5 with regard to the original length of the film. The thus-obtained stretched film was washed by passing through an alkaline washing bath 25 and a hot water washing bath 30. In the above-mentioned operation, guide rollers 21, 22, 26a, 26b and 27 were used for guiding the film to be carried to the following treatments, respectively. After washing the film, water and phenol attached to the film are removed by passing through a drying chamber 32 maintained at a temperature more than 185° C, which is higher than the boiling point of phenol. Thus prepared diacetate film 34 had an excellent splitability property. The film 34 was fed to a splitting device 36 disposed between two pairs of rollers 35a, 35b and 37a, 37b so that a split film 38 having a desired configuration was produced. The device 36 is a roller covered by numerous pins. The split film 38 had a net-like configuration comprising a plurality of stem fibers 1a provided with a plurality of fibrils and a plurality of branch fibers 1b linking the stem fibers 1a, further a plurality of fibrils 1c as shown in FIG. 3.

The average denier of the stem fibers was 8 denier (calculated diameter is 29.1 μ) and the length of the stem fibers was around 10 mm. After adding an oiling agent to the fiber sheet, fifteen oiled sheets were superimposed on each other and the piled fiber sheets were provided with crimps by the conventional stuffing type crimping machine. The average number of crimps was 16 per inch of films. The steps of spreading out the film, adding a bonding agent to the fiber sheets, gathering the crimped fiber sheets, wrapping of paper around the cylindrical mass of fiber sheet of net-like configuration, cutting the wrapped cylindrical mass of stem and branch fibers into tobacco smoke filter rods are all carried out continuously by a cigarette filter rod manufacturing machine.

In the above-mentioned process, the conditions for producing the stretched diacetate film 31 were as follows:

(1) Diacetate film:
 degree of acetylation 57%
 width of film 15 cm.
 weight per 1 m. length of film 6.0 g.
(2) Conditions of the first stretching stage:
 swelling agent aqueous solution of 70% methanol
 temperature of the swelling bath 23°C
 stretch ratio 1.4
 treating time 5 sec.
(3) Conditions of the second stretching stage:
 liquid contained in the bath aqueous solution of 2% phenol
 temperature of the bath 70°C.
 stretch ratio (spontaneous and positive stretching) 2.5 to the original length
 treating time 5 sec.
(4) Washing conditions:
 alkaline washing bath soda ash 1 g./l.
 wash ing agent of alkyl ether type 50°C 1 cc./l. aqueous solution
 temperature of the washing bath 50°C. hot water
(5) Drying conditions:
 hot air 185°C.
 treating time 5 min.

The tobacco smoke filter produced as described above had excellent properties; for example, the quantity of nicotine absorption was 25 percent when measured by the ultraviolet absorption spectrometer spectrum, the hardness of the filter was 12percent when measured with a precision micrometer of the dead weight type manufactured by the Testing Machine Co., type TMI.

EXAMPLE 2

A solution composed mainly of an acetone solution of secondary cellulose acetate containing 1 percent weight of titanium dioxide on the basis of the weight of cellulose acetate was prepared, and the cellulose acetate film was formed by a conventional film forming machine. The thickness of the produced film was 20 micron. Next, a continuous tape of 2 cm. width was manufactured by cutting the thus-produced cellulose acetate film and then the split film was produced by applying the same stretching and splitting operation as that of Example 1.

When the tape treated by the splitting machine was spread out, a net-like configuration of the fiber sheet, as shown in FIG. 3, was obtained. The average fineness of the stem fiber was 7 denier and the split length of the film was around 10 mm. After oiling the fiber sheet, fifteen of the oiled sheets were combined and piled on each other, next the piled fiber sheets were provided with crimps by the conventional stuffing type crimping machine. The average number of crimps was 15 per inch of films. Next, the same preparations as that of Example 1 were applied and a tobacco filter having excellent properties was produced.

EXAMPLE 3

The solution described in Example 2 was used to prepare the diacetate film for this example. A diacetate film having thickness of 20 micron was formed by a conventional film forming machine and then the film was cut into a plurality of tapes of 35 cm. width, next each tape was subjected to the same stretching operation, except that the total stretch ratio was 4.0. Thereby the average fineness of the stem fibers of the net-like configuration made from the tape was 5 denier and the average split length of the film was around 10 mm. Next, the sheets of split fibers were provided with crimps by the conventional stuffing box type crimping machine. The average number of crimps of the sheet was 18 per inch. And the crimped sheet was supplied to the rod manufacturing machine and the cigarette filters were produced in the same way explained in Example 1, without addition of the plasticizer. The above-mentioned processes were carried out by continuous operation without any difficulties. Further, the thus-produced tobacco smoke filter had excellent properties when measured by the same method as described in Example 1, for example, the quantity of the nicotine absorption was 27 percent and the hardness was 17 percent.

While the invention has been described in conjunction with certain embodiments thereof, it is to be understood that various modifications and changes may be made without departing from the spirit and scope of the invention.

What we claim as new and desire to secure by Letters Patent is:

1. Process for manufacturing a filter for tobacco smoke comprising:
   stretching an acetate film in two stages, wherein said acetate film is stretched in a first stage at a stretch ratio between 1.1 and 1.6, and in the second stage said acetate film is stretched spontaneously and positively in an aqueous solution containing about 1 to 3 percent of phenol at a temperature in a range of about 20° and 100° C., the total stretch ratio being in the range of about 1.4 and 4.0 with respect to said film of non-stretched condition and
   splitting up said thus stretched acetate film into a sheet of split fibers having a netlike configuration comprising a plurality of stem fibers and a plurality of branch fibers linking said stem fibers with each other so that the calculated average diameter of said stem fibers is not more than 39.5 microns and the unit length of said stem fibers defined by adjacent branch fibers is below about 20 mm.

2. Process according to claim 1 in which said split film is then crimped, formed into a cylindrically shaped mass, wrapped with paper and cut transversely into a length suitable for use as a cigarette filter rod.

3. Process according to claim 1 in which the first stage of said stretching is carried out in an aqueous solution containing a swelling agent.

4. Process for manufacturing a filter for tobacco smoke according to claim 1, in which a plurality of said split films are superimposed on each other and said plurality of superimposed split films are crimped and formed into a cylindrical mass.

5. Process for manufacturing a filter for tobacco smoke according to claim 1, in which a bonding agent is added to said split film and the split film is crimped and formed into a cylindrically shaped mass.

6. Process for manufacturing a filter for tobacco smoke according to claim 1, in which an absorbent is added to said split film and then said split film is crimped and formed into a cylindrically shaped mass.

7. Process for manufacturing a filter for tobacco smoke according to claim 1, in which an additional substance to improve the taste or smell of tobacco is added to said split film and then said split film is crimped and formed into a cylindrically shaped mass.

* * * * *